(12) United States Patent
Rose

(10) Patent No.: US 8,244,650 B2
(45) Date of Patent: Aug. 14, 2012

(54) SYSTEMS, METHODS, AND APPARATUS FOR RECURSIVE QUANTUM COMPUTING ALGORITHMS

(75) Inventor: Geordie Rose, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 1101 days.

(21) Appl. No.: 12/135,899

(22) Filed: Jun. 9, 2008

(65) Prior Publication Data
US 2008/0313114 A1    Dec. 18, 2008

Related U.S. Application Data

(60) Provisional application No. 60/943,519, filed on Jun. 12, 2007.

(51) Int. Cl.
*G06N 7/04*    (2006.01)

(52) U.S. Cl. ............ 706/13; 706/22; 708/320; 708/507; 708/803

(58) Field of Classification Search ............... 706/13
See application file for complete search history.

(56) References Cited

U.S. PATENT DOCUMENTS

| | | | | |
|---|---|---|---|---|
| 6,838,694 | B2 | 1/2005 | Esteve et al. ........... | 257/34 |
| 7,135,701 | B2 | 11/2006 | Amin et al. ........... | 257/31 |
| 7,335,909 | B2 | 2/2008 | Amin et al. ........... | 257/34 |
| 2006/0123363 | A1* | 6/2006 | Williams et al. ......... | 716/1 |
| 2006/0147154 | A1 | 7/2006 | Thom et al. ........... | 385/37 |
| 2006/0225165 | A1 | 10/2006 | van den Brink et al. ... | 977/933 |
| 2008/0176750 | A1 | 7/2008 | Rose et al. ........... | 505/170 |
| 2008/0215850 | A1 | 9/2008 | Berkley et al. ........ | 712/1 |
| 2008/0238531 | A1 | 10/2008 | Harris .................. | 327/528 |

OTHER PUBLICATIONS

Berkley, "Systems, Methods, and Apparatus for Qubit State Readout," U.S. Appl. No. 60/974,743, filed Sep. 24, 2007, 46 pages.
Blatter et al., "Design aspects of superconducting-phase quantum bits," Physical Review B 63:174511-1-174511-9, 2001.
Choi, V., "Systems, Devices, and Methods for Analog Processing," U.S. Appl. No. 60/986,554, filed Nov. 8, 2007, 39 pages.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," International Journal of Theoretical Physics 21(6/7):467-488, 1982.
Friedman et al., "Quantum superposition of distinct macroscopic states," Nature 406:43-46, Jul. 6, 2000.
Il'ichev et al., "Continuous Monitoring of Rabi Oscillations in a Josephson Flux Qubit," Physical Review Letters 91(9):097906-1-097906-4, week ending Aug. 29, 2003.
Maibaum et al., "Systems, Devices, and Methods for Analog Processing," U.S. Appl. No. 61/039,710, filed Mar. 26, 2008, 48 pages.
Makhlin et al., "Quantum-State Engineering with Josephson-Junction Devices," Reviews of Modern Physics 73(2):357-400, Apr. 2001.
Mooij et al., "Josephson Persistent-Current Qubit," Science 285: 1036-1039, Aug. 13, 1999.

(Continued)

*Primary Examiner* — Alan Chen
*Assistant Examiner* — Nathan Brown, Jr.
(74) *Attorney, Agent, or Firm* — Seed IP Law Group PLLC

(57) ABSTRACT

A recursive approach to quantum computing employs an initial solution, determines intermediate solutions, evaluates the intermediate solutions and repeats using the intermediate solution, if the intermediate solution does not satisfy solution criteria. A best one of the intermediate solutions may be employed in the recursion.

29 Claims, 11 Drawing Sheets

OTHER PUBLICATIONS

Nielsen et al., Quantum Computation and Quantum Information, Cambridge University Press, Cambridge, 2000, "7.8 Other implementation schemes," pp. 343-345.

Orlando et al., "Superconducting Persistent-Current Qubit," Physical Review B 60(22):15 398-15 413, Dec. 1, 1999.

Rose, "Systems, Methods, and Apparatus for Recursive Quantum Computing Algorithms," U.S. Appl. No. 60/943,519, filed Jun. 12, 2007, 46 pages.

Shor, "Introduction to Quantum Algorithms," AT&T Labs—Research, arXiv:quant-ph/0005003 v2, pp. 1-17, Jul. 6, 2001.

International Search Report, mailed Sep. 4, 2008, for PCT/CA2008/001115, 4 pages.

Written Opinion, mailed Sep. 4, 2008, for PCT/CA2008/001115, 3 pages.

* cited by examiner

SYSTEMS, METHODS, AND APPARATUS FOR RECURSIVE QUANTUM COMPUTING ALGORITHMS

CROSS REFERENCE TO RELATED APPLICATIONS

This application claims benefit under 35 U.S.C. 119(e) of U.S. Provisional Patent Application Ser. No. 60/943,519, filed Jun. 12, 2007 and entitled "Systems, Methods, And Apparatus For Recursive Quantum Computing Algorithms," which is incorporated herein by reference in its entirety.

BACKGROUND

1. Field

The present systems, methods, and apparatus generally relate to the implementation of recursive computing algorithms on quantum processors.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing" arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device. Examples of qubits include quantum particles, atoms, electrons, photons, ions, and the like.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar in some respects to those used for conventional integrated circuits.

Superconducting qubits are a type of superconducting device that can be included in a superconducting integrated circuit. Typical superconducting qubits, for example, have the advantage of scalability and are generally classified depending on the physical properties used to encode information including, for example, charge and phase devices, phase or flux devices, hybrid devices, and the like. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. Pat. No. 7,335,909.

Examples of flux qubits that may be used include rf-SQUIDs, which include a superconducting loop interrupted by one Josephson junction, or a compound junction (where a single Josephson junction is replaced by two parallel Josephson junctions), or persistent current qubits, which include a superconducting loop interrupted by three Josephson junctions, and the like. See e.g., Mooij et al, 1999, *Science* 285, 1036; and Orlando et al, 1999, *Phys. Rev.* B 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may provide a voltage or current. The dc-SQUID magnetometers including a loop of superconducting material interrupted by at least one Josephson junction are well known in the art.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing," and U.S. Provisional Patent Application Ser. No. 61/039,710, filed Mar. 26, 2008 and entitled "Systems, Devices, And Methods For Analog Processing."

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in US Patent Publication No. 2006-0147154 and U.S. patent application Ser. No. 12/017,995. Respective coupling strengths of the coupling devices may be tuned between zero and a maximum value, for example, to provide ferromagnetic or anti-ferromagnetic coupling between qubits.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. The coefficient s goes from 0 to 1, such that at the beginning of the evolution process the evolution Hamiltonian is equal to the initial Hamiltonian and at the end of the process the evolution Hamiltonian is equal to the final Hamiltonian. If the evolution is too fast, then the system can be excited to a higher state, such as the first excited state. In the present systems, methods, and apparatus, an "adiabatic" evolution is considered to be an evolution that satisfies the adiabatic condition, wherein the adiabatic condition is expressed as:

$$\dot{s} |\langle 1|dH_e/ds|0 \rangle| = \delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally constant and slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use natural quantum effects, such as quantum tunneling, to reach a global energy minimum more accurately or more quickly. It is known that the solution to a hard problem, such as a combinatorial optimization problem, may be encoded in the ground state of a system and therefore quantum annealing may be used to find the solution to such hard problems.

Adiabatic quantum computation is a special case of quantum annealing for which the system, ideally, begins and remains in its ground state throughout an adiabatic evolution. Thus, those of skill in the art will appreciate that quantum annealing methods may generally be implemented on an adiabatic quantum computer, and vice versa. Thus, unless the context requires otherwise, throughout this specification the terms "adiabatic quantum computing" and "adiabatic quantum computation" are used in an exemplary sense, where in fact the concepts taught herein may be applied to all forms of quantum annealing. Furthermore, reference to an "adiabatic quantum computer" throughout this specification is intended to denote a system that may be used to perform quantum computation by adiabatic quantum computation and/or by quantum annealing.

Quantum annealing is an algorithm that uses quantum mechanics as a source of disorder during the annealing process. In quantum annealing, the optimization problem is encoded in a Hamiltonian $H_P$. The algorithm starts by introducing strong quantum fluctuations by adding a disordering Hamiltonian $H_D$ that does not commute with $H_P$. An example case is:

$$H_E = H_P + \Gamma H_D,$$

where $\Gamma$ changes from a large value to zero during the evolution and $H_E$ may be thought of as an evolution Hamiltonian similar to $H_e$ described in the context of adiabatic quantum computation above. The disorder is slowly removed by removing $H_D$ (reducing $\Gamma$). Thus, quantum annealing is similar to adiabatic quantum computation in that the system starts with an initial Hamiltonian ($H_E = H_P + \Gamma H_D$ for $\Gamma$=its maximum value) and evolves through an evolution Hamiltonian ($H_E$ as $\Gamma$ is reduced) to a final "problem" Hamiltonian $H_P$ whose ground state encodes a solution to the problem. If the evolution is slow enough, the system will settle in a local minimum close to the exact solution. The slower the evolution, the better the solution that will be achieved. The performance of the computation is assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in general quantum annealing the system may not remain in its ground state throughout the entire annealing schedule. As such, quantum annealing may be implemented as a heuristic technique, where low-energy states with energy near that of the ground state may provide approximate solutions to the problem.

Adiabatic Quantum Computing and Quantum Annealing Algorithms

Typically, an adiabatic quantum computing algorithm may be directed towards producing an exact solution to a given problem. This underlying goal may lead to many complications in the implementation of the algorithm. For instance, in order to achieve an exact solution it is typically necessary to prevent transitions at all anti-crossings in the evolution of the system Hamiltonian. Since some anti-crossings may correspond to very small energy gaps, an algorithm focused on achieving an exact solution may require an impractically long evolution schedule. As previously discussed, adiabatic quantum computing may be considered to be a special case of quantum annealing, and quantum annealing is well-suited to be implemented as a heuristic technique. Accordingly, the present systems, methods and apparatus describe techniques for improving the final solution of a quantum computation achieved by either adiabatic quantum computing and/or by quantum annealing.

BRIEF SUMMARY

The present systems, methods, and apparatus represent a shift in paradigm whereby transitions at anti-crossings are accepted as probabilistic inevitabilities for practical evolution schedules and the pursuit of the "exact" solution is relaxed.

At least one embodiment may be summarized as a method of solving a problem including establishing an initial solution to the problem; encoding the initial solution in an initial state of at least a portion of a quantum computing system; performing a quantum computation with the quantum computing system that results in a final state of the at least a portion of the quantum computing system, wherein the final state represents an intermediate solution to the problem; evaluating the intermediate solution to the problem against a set of at least one predetermined solution criterion; and for an intermediate solution that does not satisfy the set of at least one predetermined solution criterion, repeating, until the set of at least one predetermined solution criterion is satisfied, the encoding, quantum computing, and evaluating with the intermediate solution encoded as the initial state of the at least a portion of the quantum computing system. Encoding the initial solution in an initial state of at least a portion of a quantum computing system may include encoding the initial solution in an initial state in at least a portion of an adiabatic quantum computing system and performing at least one quantum computation includes performing at least one adiabatic quantum computation. Performing at least one quantum computation may include quantum annealing. Encoding the initial solution in an initial state of at least a portion of a quantum computing system may include encoding the initial solution in an initial state of at least a portion of at least one superconducting quantum processor. Encoding the initial solution in an initial state of at least a portion of at least one superconducting quantum processor may include encoding the initial solution in the initial state in at least one superconducting quantum processor that includes at least two superconducting devices. At least one of the superconducting devices may be selected from the group consisting of: a superconducting flux qubit, a superconducting phase qubit, a superconducting charge qubit, a superconducting hybrid qubit, and a superconducting coupling device. Establishing the initial solution to the problem may include determining at least one of: a random initial solution, an educated estimate, a known approximation, the result of a classical heuristic, the result of a classical computation, and the result of a quantum computation. Evaluating the intermediate solution to the problem against a set of at least one predetermined solution criterion may include evaluating the intermediate solution against at least one of: a minimum degree of solution accuracy, a maximum allowed computation time, and a maximum allowed number of iterations.

At least one embodiment may be summarized as a method of solving a problem including establishing an initial solution to the problem; encoding the initial solution in an initial state of at least a portion of a quantum computing system; repeating n quantum computations with the quantum computing system to establish a set of n final states of the at least a portion of the quantum computing system wherein each final state in the set of n final states represents a respective intermediate solution to the problem; evaluating each intermediate solution to determine a best intermediate solution; evaluating the best intermediate solution against a set of at least one predetermined solution criterion; and where the best intermediate solution does not satisfy the set of at least one predetermined solution criterion, repeating, until the set of at least one predetermined solution criterion is satisfied, the encoding, quantum computing, and evaluating with the intermediate solution encoded as the initial state of the at least a portion of the quantum computing system. The number of final states n in the $i^{th}$ set of n final states may be the same as the number of final states n in the $(i-1)^{th}$ set of n final states. The number of final states n in the $i^{th}$ set of n final states may not be the same as the number of final states n in the $(i-1)^{th}$ set of n final states, and the number of final states n in the $i^{th}$ set of n final states may depend on at least one characteristic of the problem.

At least one embodiment may be summarized as a quantum computing system including a quantum processor including a set of qubits, wherein the set of qubits includes at least two qubits and wherein at least two of the qubits in the set of qubits are configured to couple information between one another; a signal input system that communicates with at least one of the qubits; a signal output system that communicates with at least one of the qubits; and a feedback system that communicates between the signal input system and the signal output system of the quantum computing system. The quantum processor may be a superconducting quantum processor that may include superconducting devices and at least one of the signal input system, the signal output system, and the feedback system includes at least one superconducting component. At least one superconducting device in the quantum processor may be selected from the group consisting of: a superconducting flux qubit, a superconducting phase qubit, a superconducting charge qubit, a superconducting hybrid qubit, and a superconducting coupling device. The signal input system may include a plurality of individual signal lines that communicate with the qubits of the quantum processor. The signal input system may include a memory administration system and wherein the memory administration system may include at least one memory register. The signal output system may include at least one readout device for reading out a state of at least one qubit in the quantum processor. At least one readout device may include a superconducting quantum interference device (SQUID). The feedback system may include a signal converter that converts a signal that is output by the quantum processor into a form that may be read by an input of the quantum processor. The signal converter may be connected to both the signal output system and the signal input system, such that at least a portion of direct communication between the signal output system and the signal input system passes through the signal converter. The feedback system may include at least one processing component that processes at least one signal that is output by the quantum processor. The feedback system may include at least one user interface.

At least one embodiment may be summarized as a recursive method of quantum computing including a first iteration wherein a quantum processor is used to perform a quantum computation, whereby a first solution to a problem is determined; and a second iteration wherein the quantum processor is used to perform a quantum computation, whereby a second solution to a problem is determined, and wherein the first solution to the problem is used to influence a quantum computation in the second iteration.

The recursive method of quantum computing may further include a number N of additional iterations, wherein each iteration involves using the quantum processor to perform a quantum computation such that each iteration produces a respective solution to the problem, wherein a quantum computation in each subsequent iteration is influenced by the solution from at least one previous iteration, and wherein N is a positive integer.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with analog processors, such as quantum processors, quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
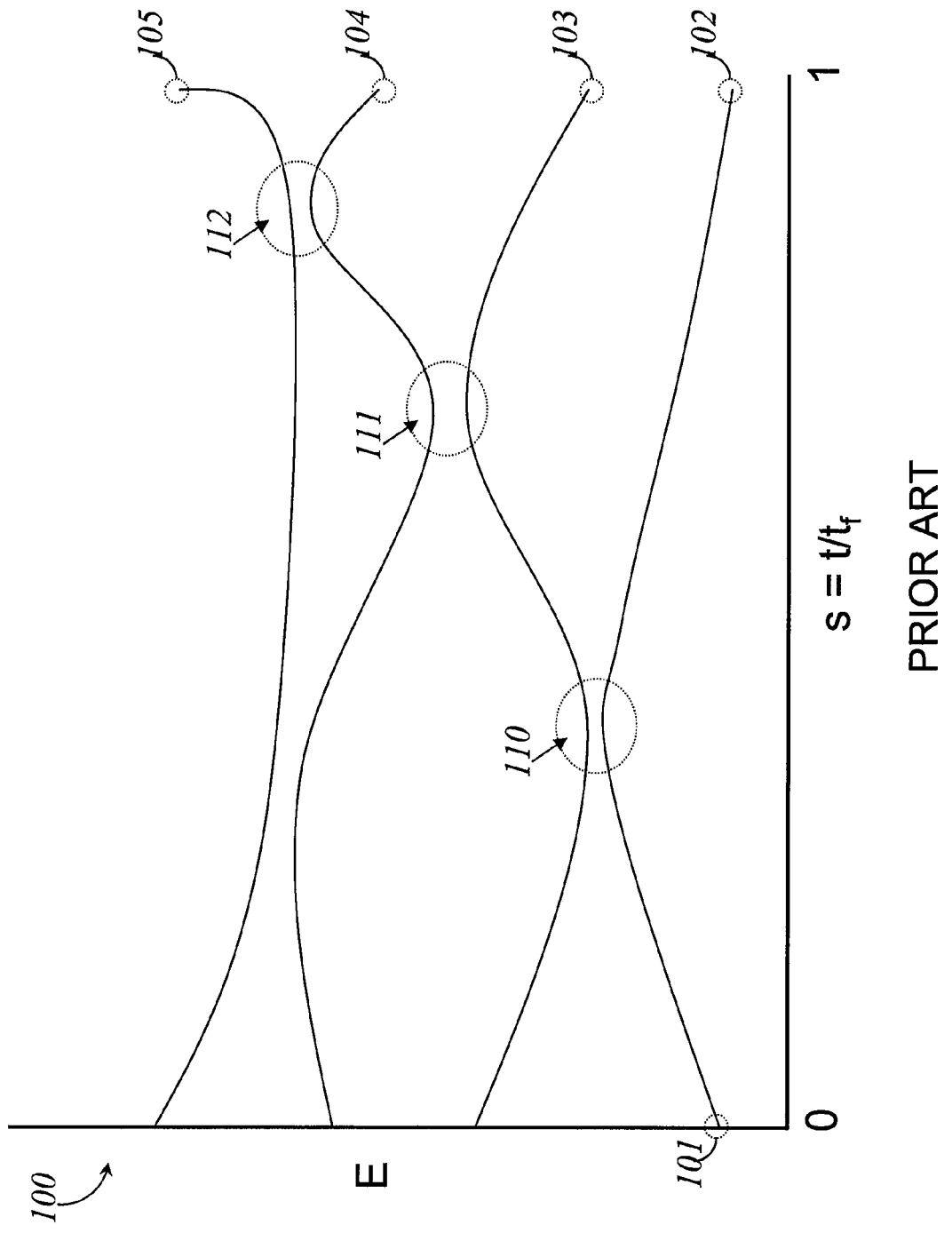
FIG. 1 is an approximate graph showing an exemplary energy spectrum for a system performing adiabatic quantum computation.

Adiabatic quantum computation typically involves gradually evolving a system from a known initial Hamiltonian to a final Hamiltonian where the ground state of the final Hamiltonian encodes a solution to a problem. The adiabatic theorem states that, provided the evolution occurs slowly enough, the ground state of the initial Hamiltonian will evolve into the ground state of the final (solution) Hamiltonian. This means that if the system can be kept in its ground state throughout the evolution then it may naturally reveal the exact solution to the problem at the end of the evolution, provided the problem has a unique solution. However, many other energy states exist above the ground state of the system, and these energy states also shift during the evolution process. At specific points in the evolution, called "anti-crossings", the gap between the ground state and a higher, or excited, energy state may become so small that the system may transition by, for example, a Landau-Zener transition into the excited energy state. At the end of the evolution, if the system is in one of these excited energy states rather than its ground state then the solution given may not be exact. Instead, an approximate solution may have been reached whose accuracy depends on how far removed the excited energy state is from the final ground state of the system. The evolution of the various energy states in the system may be described graphically by the system's energy spectrum. FIG. 1 is an approximate graph showing an exemplary energy spectrum 100. Exemplary energy spectrum 100 is used for illustrative purposes only and is not intended to describe the exact energy spectrum of all embodiments of the present systems, methods, and apparatus. The evolution path of each energy state, the anti-crossings, and the relative locations of all energy states in FIG. 1 are for illustrative purposes only. Those of skill in the art will appreciate that the present systems, methods, and apparatus may be applied with a wide range of system energy spectra depending on the characteristics of the problem being solved.

FIG. 1 shows an example of an energy spectrum that may be produced as a system evolves from an initial to a final Hamiltonian. Within the axes, each line represents the evolution of a particular energy state as s, the evolution coefficient, increases from 0 to 1. The ground state of the initial Hamiltonian 101 is the state with the lowest energy when s=0. The ground state of the final Hamiltonian 102 is the state with the lowest energy when s=1. As an example, three excited states are shown in FIG. 1. The first excited energy state of the final Hamiltonian 103 is the state with the next highest energy level above the ground state when s=1. It follows that the second and third excited energy states of the final Hamiltonian (104 and 105, respectively) are the states with the next two highest energy levels above the first excited state when s=1. As s goes from 0 to 1, the system evolves. Starting in the ground state of the initial Hamiltonian 101 (as is typically the case in an adiabatic quantum computation), the energy level of the system may follow a number of different paths depending on whether or not transitions occur at the anti-crossings. Three example anti-crossings are shown in FIG. 1. Anti-crossing 110 represents the minimum gap between the ground state and the first excited state of the evolution Hamiltonian. Anti-crossing 111 represents the minimum gap between the first excited state and the second excited state of the evolution Hamiltonian. Anti-crossing 112 represents the minimum gap between the second excited state and the third excited state of the evolution Hamiltonian. Anti-crossings 110-112 represent the locations where it is most likely that the system will transition from a lower energy state into a higher energy state as the system evolves. It is typically the goal of adiabatic quantum computation to avoid such transitions and to keep the system in its ground state throughout the evolution. The typical technique of avoiding such transitions involves evolving adiabatically (that is, sufficiently slowly) past the anti-crossings.

Those of skill in the art will appreciate that an implementation of quantum annealing may involve an energy spectrum that is similar to that shown in FIG. 1. However, in quantum annealing the system may begin in an excited energy state (or a superposition of states) as opposed to the ground state such that a transition at an anti-crossing, in the downward direction, is actually desired.

Figure 2:
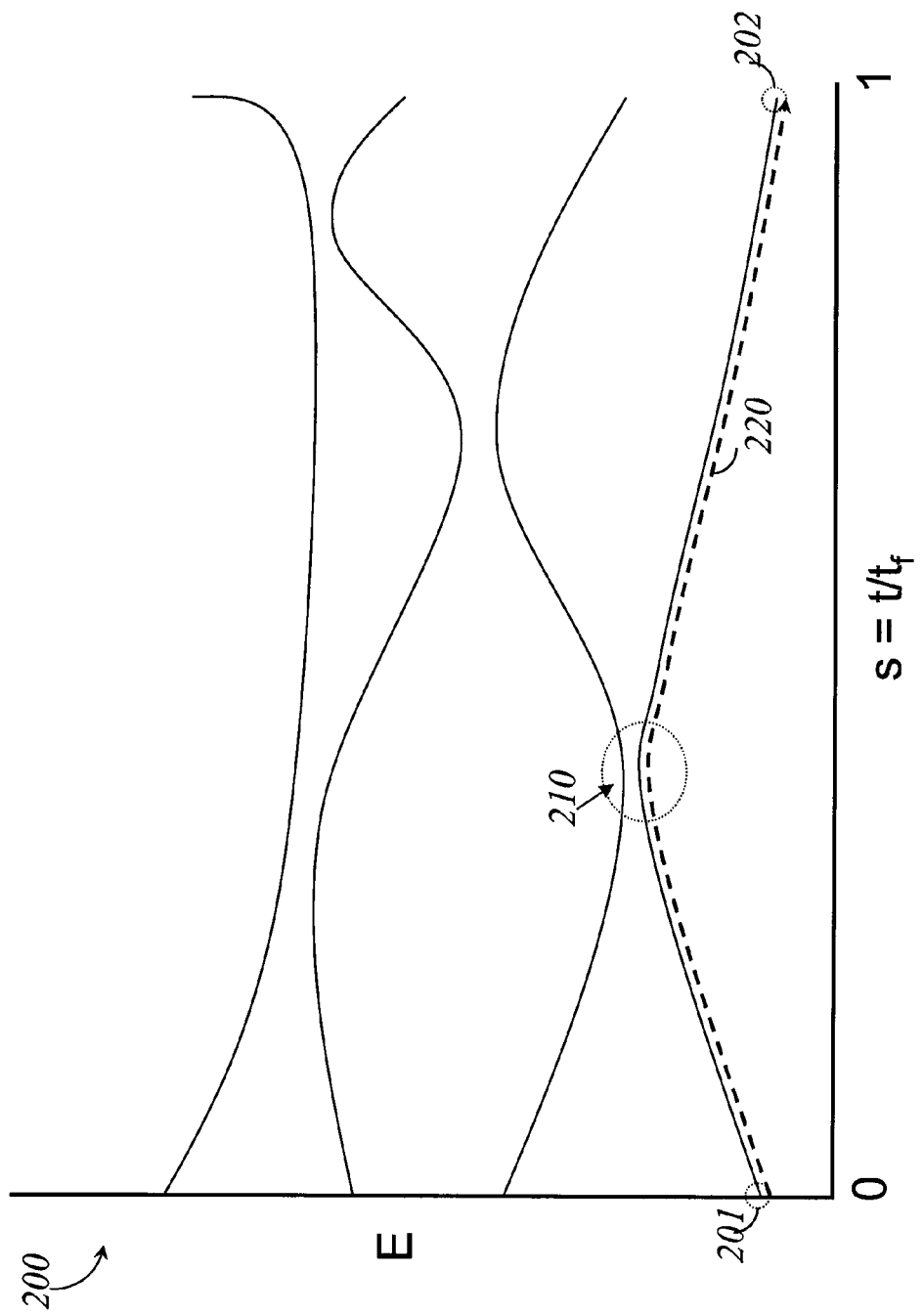
FIG. 2 is an approximate graph showing an exemplary energy spectrum that illustrates an ideal evolution path for a system performing adiabatic quantum computation.

FIG. 2 is an approximate graph showing an exemplary energy spectrum 200 that illustrates an ideal evolution path 220 for a system performing adiabatic quantum computation. For clarity, exemplary energy spectrum 200 is identical to exemplary energy spectrum 100 of FIG. 1, though those of skill in the art will appreciate that a wide range of energy spectra may be produced during adiabatic quantum computation. At s=0, the system begins in the ground state of the initial Hamiltonian 201. From here, the ideal evolution path 220 for a system performing adiabatic quantum computation is along the dashed line. As s evolves from 0 to 1, evolution path 220 is ideal because it remains in the ground state of the evolution Hamiltonian and does not transition into the first excited state at anti-crossing 210. Evolution path 220 ends in the ground state 202 of the final Hamiltonian and may produce an exact solution to the problem being solved. In practice, however, an ideal evolution path such as evolution path 220 may be very difficult to implement. Energy spectrum 200 in FIG. 2 is a relatively simple spectrum that includes very few anti-crossings. In practice, energy spectra may be far more complicated and may include many more anti-crossings. Furthermore, the exact locations of anti-crossings may be difficult to establish and the size of the gap at an anti-crossing may be much smaller than that illustrated in anti-crossing 210. These complications can render an ideal evolution path, such as evolution path 220 extremely difficult to implement physically without submitting to an unrealistically long evolution time.

Figure 3:
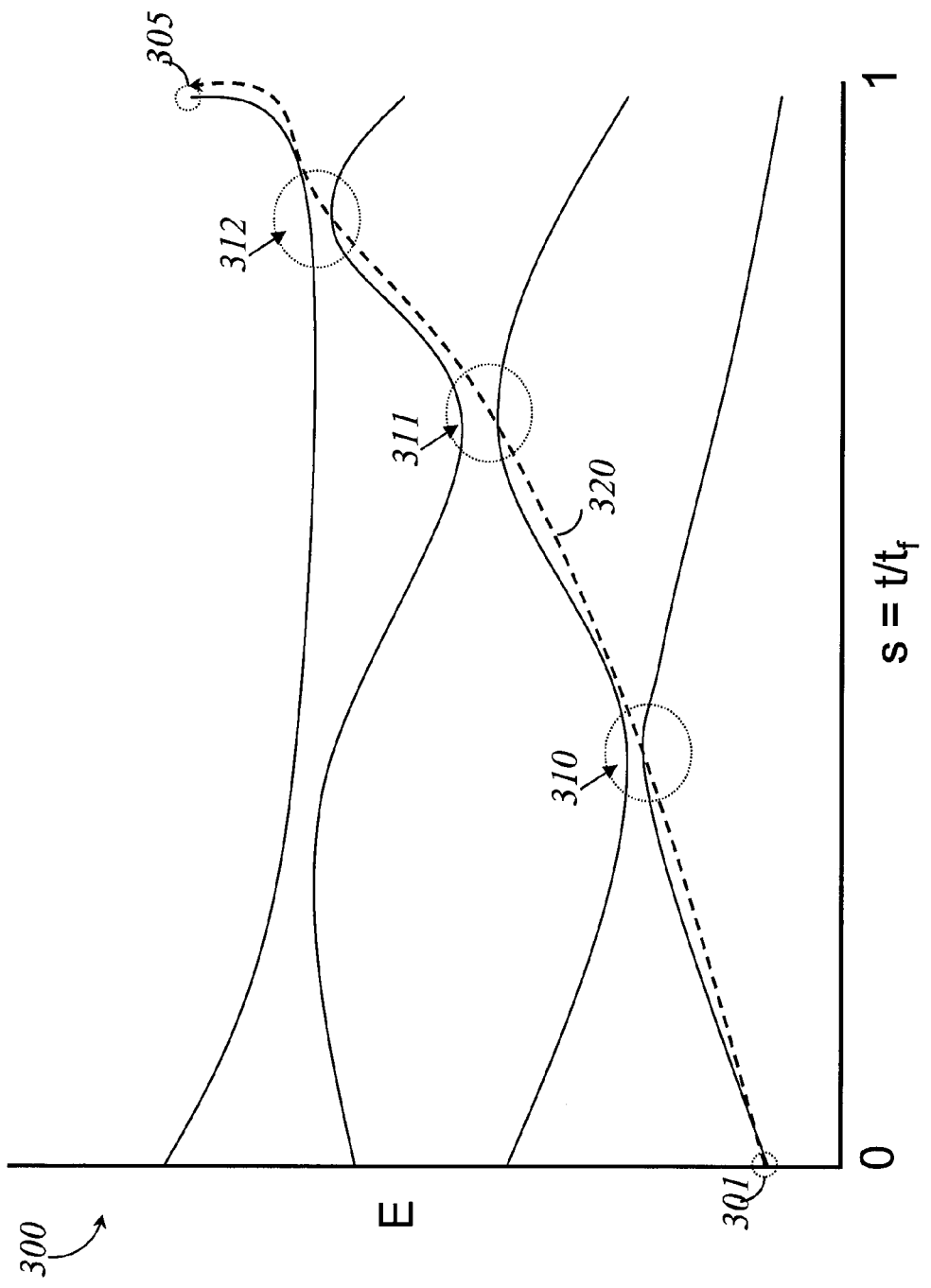
FIG. 3 is an approximate graph showing an exemplary energy spectrum that illustrates a worst-case evolution path for a system performing adiabatic quantum computation.

In contrast, FIG. 3 is an approximate graph showing an exemplary energy spectrum 300 that illustrates a worst-case evolution path 320 for a system performing adiabatic quantum computation. For clarity, exemplary energy spectrum 300 is identical to exemplary energy spectrums 200 and 100, though those of skill in the art will appreciate that a wide range of energy spectra may be produced during adiabatic quantum computation. At s=0, the system begins in the ground state of the initial Hamiltonian 301. From here, the worst-case evolution path 320 for a system performing adiabatic quantum computation is along the dashed line. As s evolves from 0 to 1, evolution path 320 is the worst-case because the system transitions into an excited energy state at every anti-crossing it encounters during the evolution. Following worst-case evolution path 320, the system transitions from the ground state of the evolution Hamiltonian to the first excited state of the evolution Hamiltonian at anti-crossing 310. The system then transitions from the first excited state of the evolution Hamiltonian to the second excited state of the evolution Hamiltonian at anti-crossing 311. The system then transitions from the second excited state of the evolution Hamiltonian to the third excited state of the evolution Hamiltonian at anti-crossing 312. Evolution path 320 ends in the third excited state of the final Hamiltonian 305 and may produce an inaccurate solution to the problem being solved. In fact, evolution path 320 ends in the highest available energy state that is compatible with the choice of initial state used in this example. In some instances, path 320 ends in a state that is the same as the initial state. In some applications, having three energy states below the final state of the system at s=1 indicates that there are three solutions to the problem available that are better than the solution reached by the adiabatic quantum computer following evolution path 320.

Figure 4:
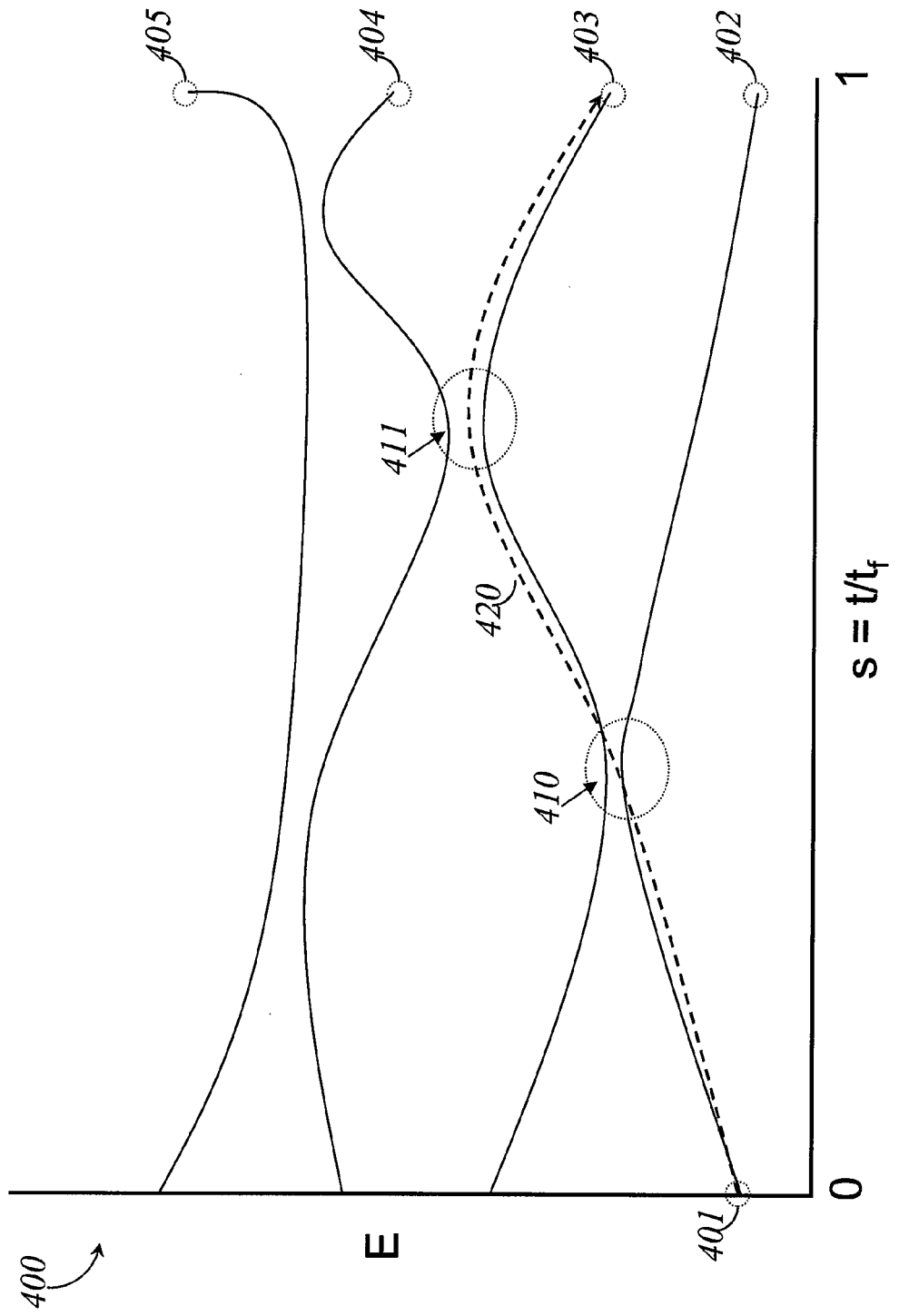
FIG. 4 is an approximate graph showing an exemplary energy spectrum that illustrates an arbitrary evolution path for a system performing adiabatic quantum computation.

FIG. 4 is an approximate graph showing an exemplary energy spectrum 400 that illustrates an arbitrary evolution path 420 for a system performing adiabatic quantum computation. For clarity, exemplary energy spectrum 400 is identical to exemplary energy spectrums 300, 200 and 100, though those of skill in the art will appreciate that a wide range of energy spectra may be produced during adiabatic quantum computation. At s=0, the system begins in the ground state of the initial Hamiltonian 401. From here, the arbitrary evolution path 420 for a system performing adiabatic quantum computation is along the dashed line. As s evolves from 0 to 1, evolution path 420 is an arbitrary example of a path a system may take as the initial Hamiltonian evolves into the final Hamiltonian. Following evolution path 420, the system transitions from the ground state of the evolution Hamiltonian to the first excited state of the evolution Hamiltonian at anti-crossing 410. The system then passes anti-crossing 411 and does not transition from the first excited state of the evolution Hamiltonian to the second excited state of the evolution Hamiltonian. The system then remains in the first excited state of the evolution Hamiltonian as the system continues to evolve. Evolution path 420 ends in the first excited state of the final Hamiltonian 403 and may produce an inaccurate solution to the problem being solved. However, excited energy states 404 and 405 in the final Hamiltonian are of higher energy than excited energy state 403. For this reason, excited energy state 403 (the solution reached by evolution path 420) is an approximate solution that may be a "better solution" than excited energy states 404 and 405. The "best" solution remains the ground state of the final Hamiltonian 402, but excited energy state 403 may represent a solution that is "good enough" to satisfy some solution criteria.

Figure 5:
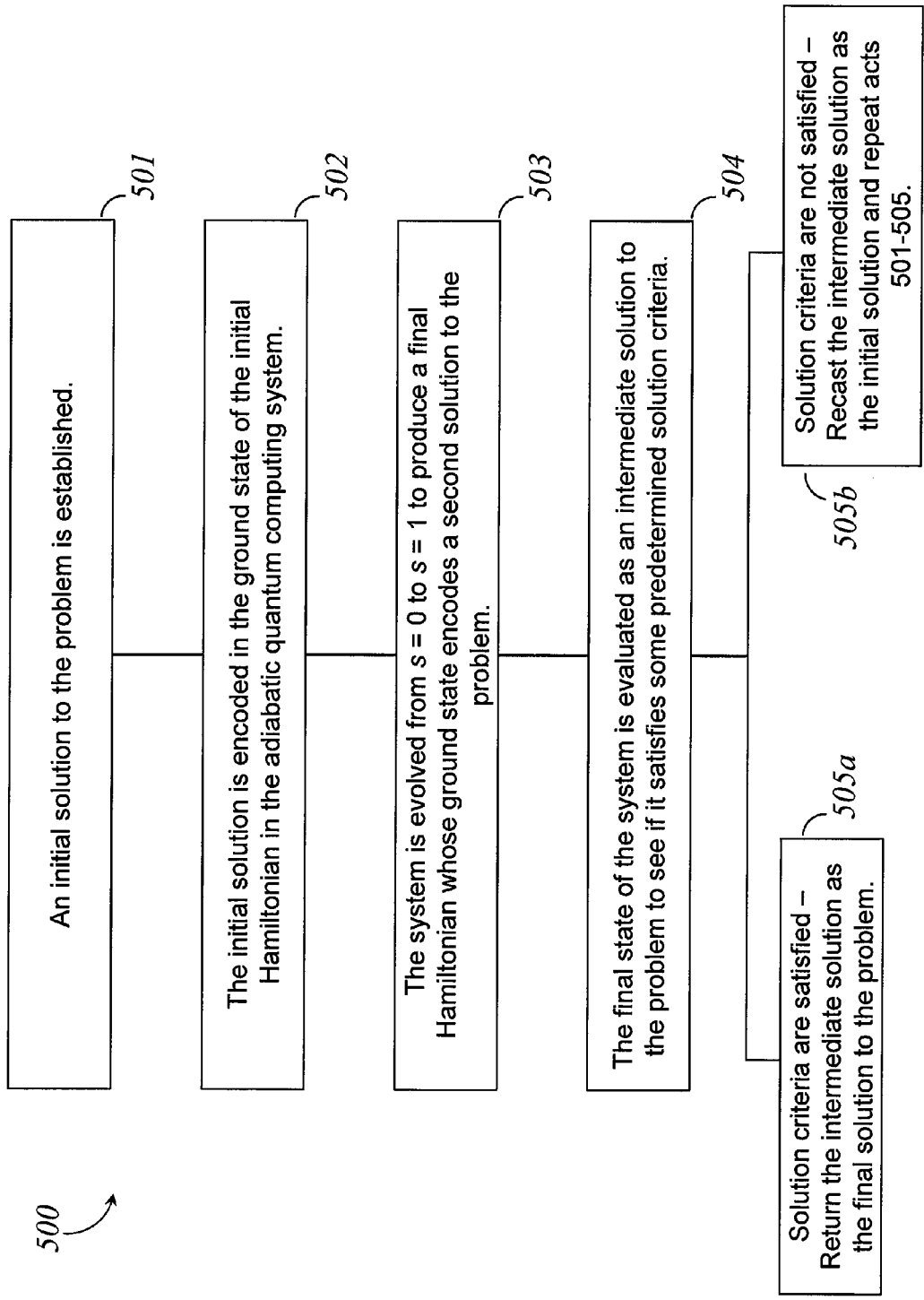
FIG. 5 is a flow-diagram that illustrates an embodiment of a method for performing recursive adiabatic quantum computing algorithms

The present systems, methods, and apparatus describe what is believed to be the first recursive algorithm for adiabatic quantum computation and/or quantum annealing. Specifically, a method of adiabatic quantum computation is described for recursively increasing the accuracy of an approximate solution as opposed to the standard approach of pursuing an exact solution. FIG. 5 is a flow-diagram that illustrates an embodiment of this method 500. Method 500 is a novel approach to adiabatic quantum computation that is focused on first finding a "good" solution as opposed to an "exact" solution to a problem, and then gradually improving the accuracy of that solution until some predetermined solution criteria are met. In act 501, an initial solution to the problem is established. This initial solution may be a random guess, or it may be an educated estimate based on some information about the system, or it may be a known approximate solution to the problem. In act 502, the initial solution is encoded in the ground state of the initial Hamiltonian of the adiabatic quantum computing system. In act 503, the system is evolved from s=0 to s=1 to produce a final Hamiltonian whose ground state encodes a second solution to the problem. At s=1, the final state of the system may or may not be in the ground state of the final Hamiltonian. In act 504, the final state of the system is evaluated as an intermediate solution to the problem to see if it satisfies some predetermined solution criteria. If the solution criteria are satisfied, then this intermediate solution is returned as the final solution to the problem in act 505a. If the solution criteria are not satisfied, then this intermediate solution is recast as the initial solution to the problem in act 505b and acts 501 through 505 (a or b) are repeated with the initial Hamiltonian reconfigured to encode the intermediate solution in its ground state. Thus, method 500 is a recursive approach to adiabatic quantum computation whereby the solution is continually refined in repeated iterations until some predetermined solution criteria are met. The solution criteria may be specific to the particular problem being examined, but examples of solution criteria include: the level of accuracy in the solution, the elapsed computation time, the number of iterations, and so forth. Those of skill in the art will appreciate that the nature of the solution criteria may be highly case-specific.

In act 501, an initial solution to the problem is established. As previously stated, this initial solution may be established through a variety of different means. For example, the initial solution may be the result of some classical heuristic attempt to solve the problem, or the initial solution may be established based on some characteristics of the problem. Alternatively, the initial solution may come from an educated guess, or a first iteration of an adiabatic quantum computing or quantum annealing algorithm. Those of skill in the art will appreciate that the exact manner in which the initial solution is established may be highly case-specific. Furthermore, those of skill in the art will appreciate that, in some embodiments, a randomly selected initial starting point may be the preferred initial solution.

In act 502, the initial solution is encoded in the ground state of the initial Hamiltonian of the adiabatic quantum computing system. As shown in FIGS. 1-4, this ground state is the lowest energy state in the initial Hamiltonian of the system when s=0, before evolution begins. For quantum computation by adiabatic quantum computation, the system may be initialized in this ground state before the evolution begins. In act 503, the system is evolved from s=0 to s=1 to produce a final Hamiltonian whose ground state encodes a second solution to the problem. As previously stated, typical approaches to adiabatic quantum computation are focused on maintaining the system in its ground state throughout the adiabatic evolution of the system Hamiltonian. The present systems, methods, and apparatus relax this constraint and thereby allow for faster rates of evolution.

In some embodiments, a worst-case scenario evolution such as that illustrated in FIG. 3 may produce a final state of the system that is the same as the initial state of the system. That is, if a transition occurs at each and every anti-crossing in the evolution of the system Hamiltonian, then the intermediate solution reached may be the same as the initial solution encoded in the initial Hamiltonian. Therefore, in such embodiments, the intermediate solution reached after any given iteration will always be at least as good as the corresponding initial solution. Furthermore, in such embodiments, if during the evolution the system manages to pass at least one anti-crossing without making a transition, the intermediate solution reached may be better than the corresponding initial solution even if the system makes a transition at every other anti-crossing available. When a transition is made at an anti-crossing, the intermediate solution subsequently reached may not be an exact solution, but it may still satisfy some solution criteria. In act 504, the intermediate solution reached after an evolution is evaluated to determine whether or not the solution criteria have been met. If the solution criteria have been met, act 505a is carried out, whereby the intermediate solution is accepted as the final solution to the problem. If the solution criteria have not been met, then act 505b is carried out, whereby the intermediate solution is recast as the initial solution to the problem and the initial system Hamiltonian is reconfigured so that the new initial solution is encoded in its ground state. In some embodiments of the present systems, methods, and apparatus, when acts 501-504 are repeated with the new initial solution, the resulting intermediate solution can be no worse than the corresponding initial solution. That is, the solution can only stay the same or get better. Thus, by repeating method 500 the accuracy of a given solution may be recursively improved until some solution criteria are satisfied.

As described in relation to FIG. 4, for any given iteration the number of available solutions that are better than the intermediate solution may be equal to the number of energy states in the final Hamiltonian at s=1 that are lower in energy than the energy state represented by the intermediate solution. However, in certain scenarios it is possible that ultimately reaching the ground state in the final Hamiltonian may not be feasible. For example, the evolution time required to adiabatically pass an anti-crossing without transitioning may be unacceptably long or the number of iterations required to eventually pass an anti-crossing without transitioning may be unacceptably high. In these instances, it is still possible that an acceptable solution may be reached if the condition of obtaining an exact solution is relaxed.

Figure 6:
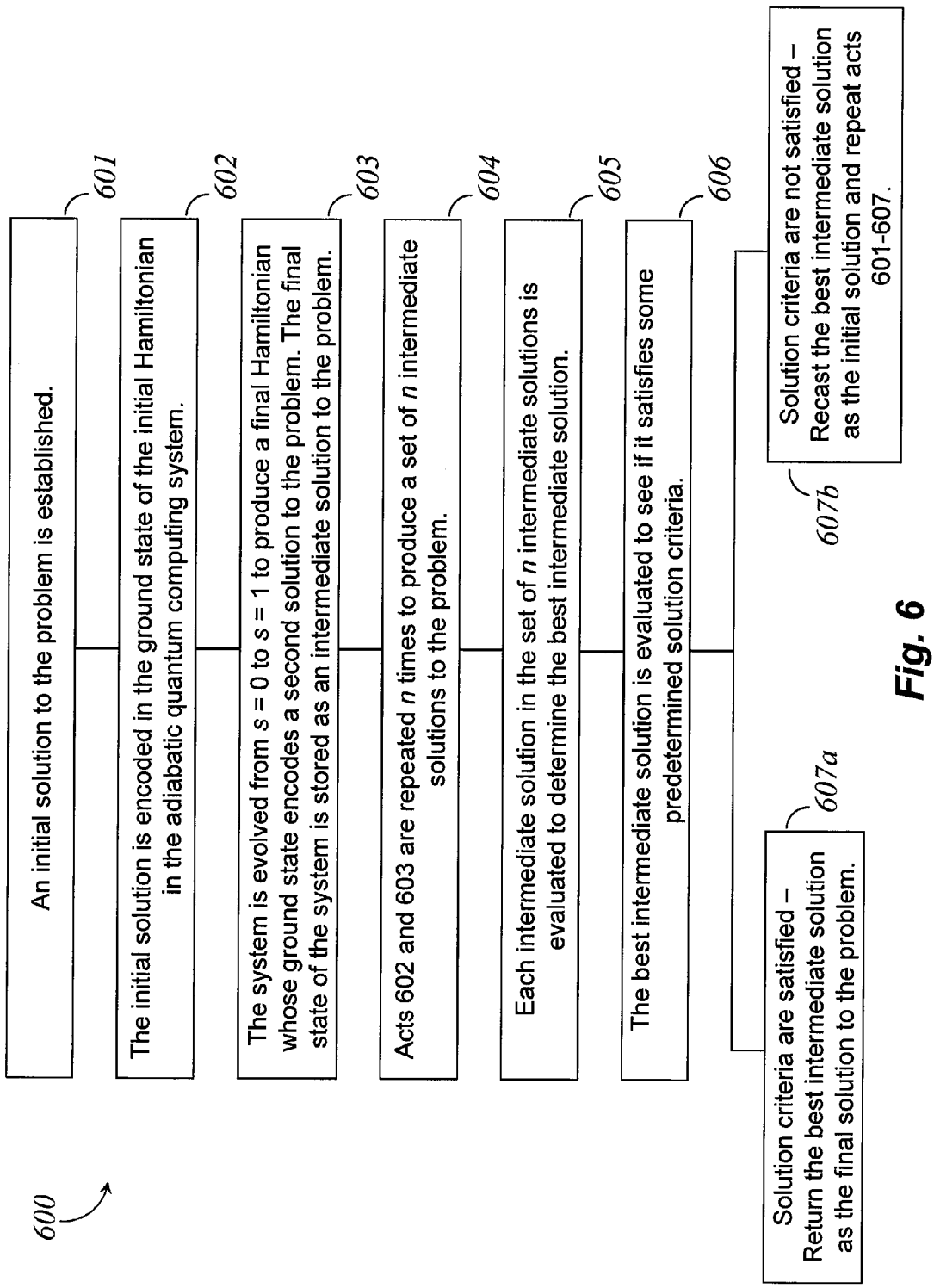
FIG. 6 is a flow-diagram that illustrates another embodiment of a method for performing recursive adiabatic quantum computing algorithms.

In an embodiment of method 500, the intermediate solution is evaluated after each iteration and, when the solution criteria are not satisfied, the intermediate solution is recast as the initial solution to begin the next iteration. This cycle may be repeated until the solution criteria are satisfied, with the initial Hamiltonian being reconfigured at the beginning of each iteration to reflect the results of the previous iteration. However, in certain systems the reconfiguration of the initial Hamiltonian may be a time-consuming process. This issue is addressed by another embodiment of the present systems, methods and apparatus. FIG. 6 is a flow-diagram that illustrates recursive adiabatic quantum computing method 600. Method 600 is a more detailed embodiment of method 500, and thus previous descriptions of method 500 may also apply to embodiments of method 600. In act 601, an initial solution to the problem is established. As before, this initial solution may be established in a variety of different ways including random guess, educated estimation, and known approximation. In act 602, the initial solution is encoded in the ground state of the initial Hamiltonian of the adiabatic quantum computing system. In act 603, the system is evolved from s=0 to s=1 to produce a final Hamiltonian whose ground state encodes a second solution to the problem. At s=1, the final state of the system may or may not be in the ground state of the final Hamiltonian. This final state is stored as an intermediate solution to the problem. In act 604, acts 602 and 603 are repeated n times with the same initial solution, so that a set of n intermediate solutions is established where each of the n intermediate solutions stems from the same initial solution and initial Hamiltonian configuration. In act 605, each intermediate solution in the set of n intermediate solutions is evaluated to determine the "best" intermediate solution within the set. In act 606, the best intermediate solution in the set of n intermediate solutions is evaluated to see if it satisfies some solution criteria. If the solution criteria are satisfied, then this best intermediate solution is returned as the final solution to the problem in act 607a. If the solution criteria are not satisfied, then this best intermediate solution is recast as the initial solution to the problem in act 607b and acts 601-607 (a or b) are repeated with the initial Hamiltonian reconfigured to encode the new initial solution in its ground state.

In act 604 of method 600, the number of intermediate solutions n calculated in the algorithm may vary depending on the nature of the problem and solution criteria. Furthermore, in repeated cycles of method 600, for example, when the solution criteria are not met by the best intermediate solution in the set of n intermediate solutions, the number of intermediate solutions n calculated in act 604 may vary. That is, in a first iteration of method 600, the number of intermediate solutions n calculated in act 604 may be some positive integer $n_1$. In a subsequent iteration of method 600, the number of intermediate solutions n calculated in act 604 may be some positive integer $n_2$, where $n_2 \neq n_1$. For any given iteration, the number of intermediate solutions n calculated in act 604 may be adjusted to accommodate some aspect of the specific problem or solution criteria being handled. Thus, for the $i^{th}$ iteration the number of intermediate solutions $n_i$ calculated in act 604 may vary, where $n_i$ is any positive integer.

Method 600 is a recursive approach to adiabatic quantum computation whereby the solution is continually refined in repeated iterations until some predetermined solution criteria are met. As in method 500, the solution criteria may be specific to the particular problem being examined, but examples of solution criteria include: the level of accuracy in the solution, the elapsed computation time, the number of iterations, and so forth. Those of skill in the art will appreciate that the nature of the solution criteria may be highly case-specific.

Figure 7:
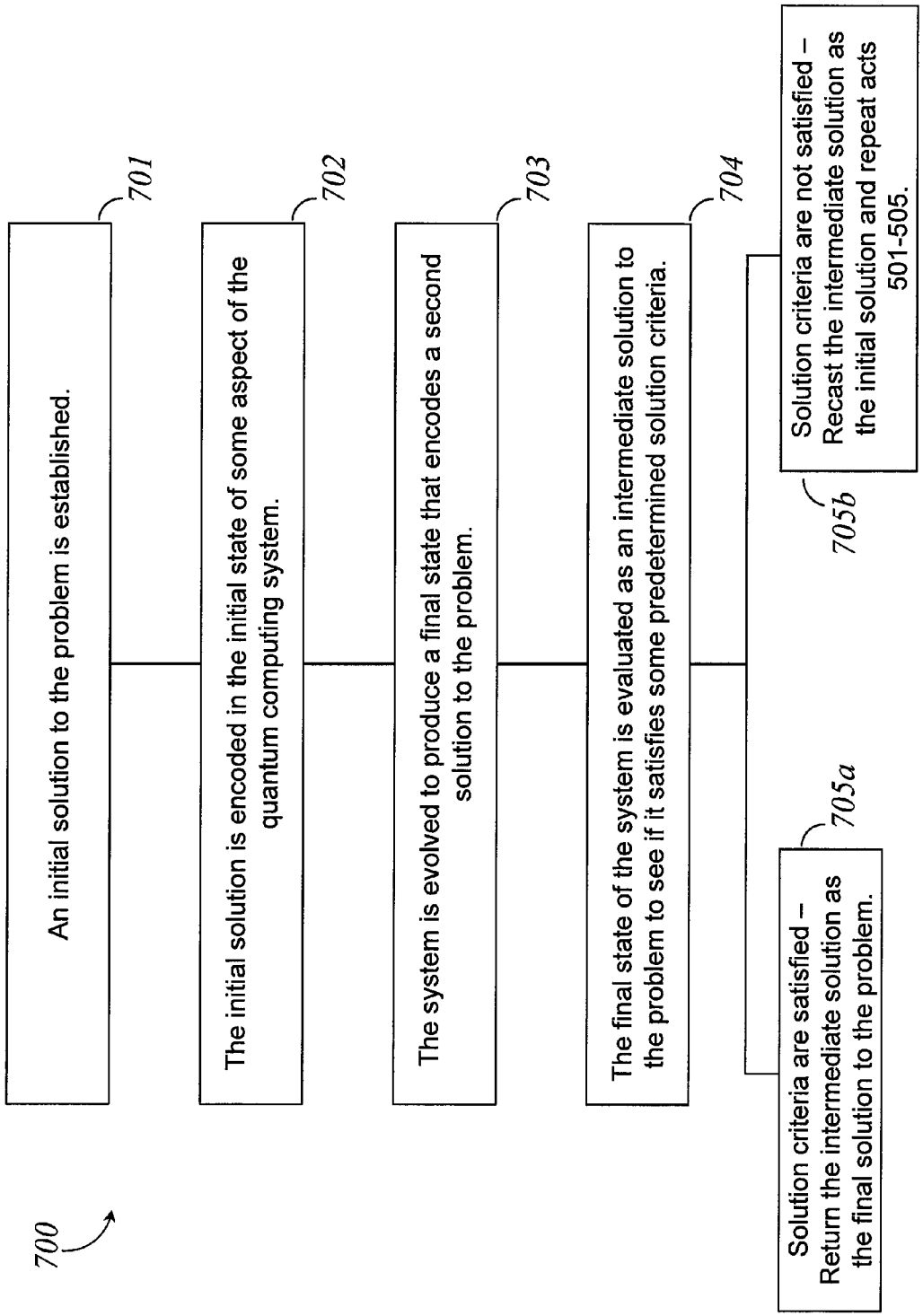
FIG. 7 is a flow-diagram that illustrates an embodiment of a method for performing general recursive quantum computing algorithms.

Those of skill in the relevant art will also appreciate that the present systems, methods, and apparatus may be applied to other forms of quantum computing systems and are not limited to adiabatic quantum computing systems. FIG. 7 is a flow-diagram that illustrates general recursive quantum computing method 700. In act 701, an initial solution to the problem is established. As before, this initial solution may be established in a variety of different ways including initial calculation, random guess, educated estimation, and known approximation. In act 702, the initial solution is encoded in the initial state of some aspect of the quantum computing system. In act 703, the system is evolved to produce a final state that encodes a second solution to the problem. This evolution may involve performing one or more quantum computations, manipulations, or operations. The final state is stored as an intermediate solution to the problem. In act 704, the intermediate solution reached after an evolution is evaluated to determine whether or not the solution criteria have been met. If the solution criteria have been met, act 705$a$ is carried out, whereby the intermediate solution is accepted as the final solution to the problem. If the solution criteria have not been met, then act 705$b$ is carried out, whereby the intermediate solution is recast as the initial solution to the problem and steps 702-705 ($a$ or $b$) are repeated using the new initial solution. Thus, method 700 applies to any quantum computing system in which the computation process may be reiterated using the solution from each iteration as the starting point for the subsequent iteration.

Figure 8:
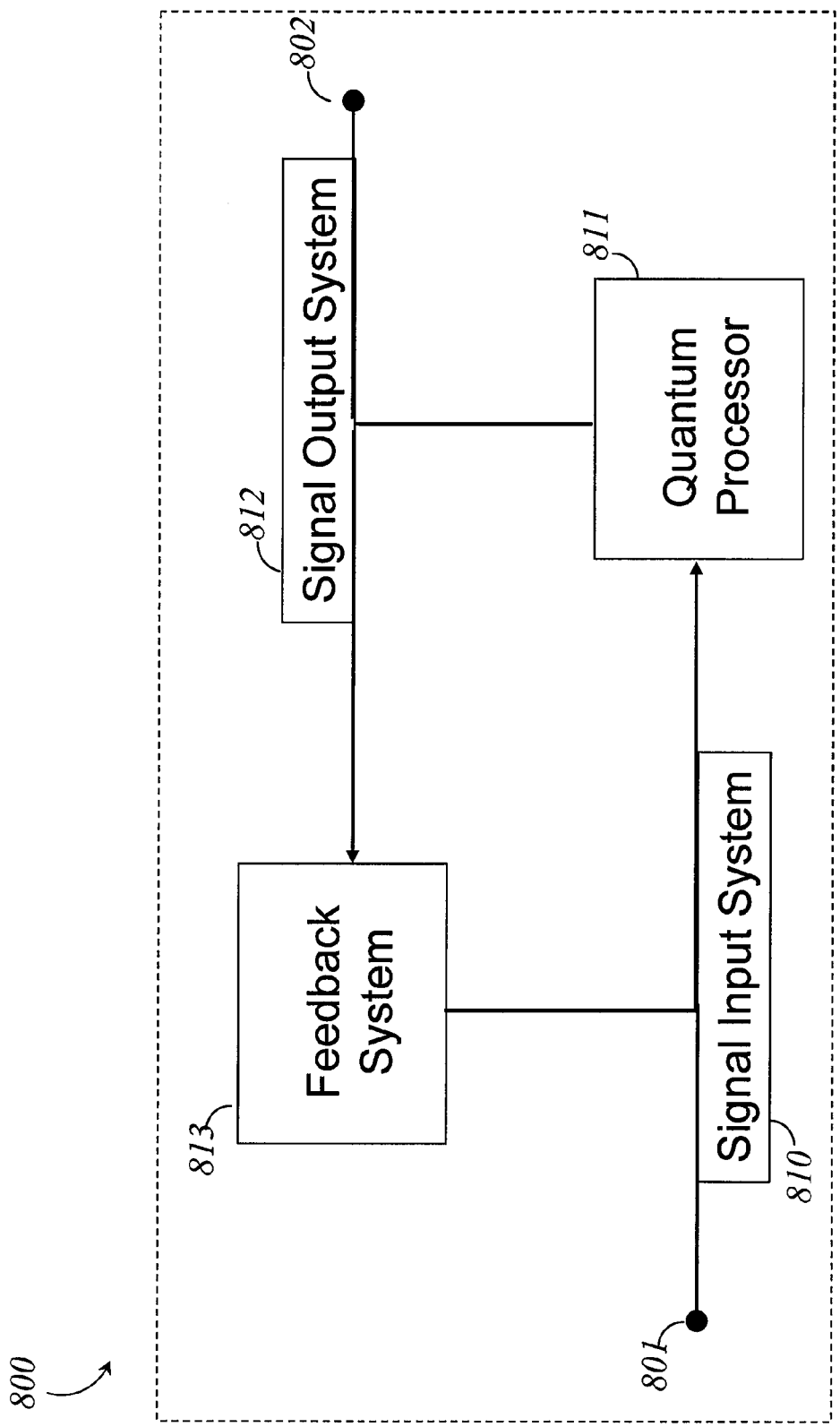
FIG. 8 is a functional diagram of one embodiment of a quantum computing system that incorporates a feedback system according to the present systems, methods and apparatus.

In some embodiments of the present systems, methods and apparatus a quantum computing system may comprise a signal input system, a signal output system, and a feedback system that communicates between the signal input system and the signal output system. Such a feedback system may be used to communicate the output of a first iteration of a quantum computation to the input of a subsequent iteration of a quantum computation. FIG. 8 is a functional diagram of quantum computing system 800 that incorporates a feedback system 813 that communicates between the signal input system 810 and the signal output system 812 of the quantum computing system 800. In operation, quantum computing system 800 may receive a first initial solution to the problem at input 801. As previously discussed, this first initial solution may be established by a variety of means. For example, the initial solution may be the result of some classical heuristic attempt to solve the problem, or the initial solution may be established based on some characteristics of the problem. The initial solution is transmitted to quantum processor 811 through signal input system 810 and the programmable elements of quantum processor 811 are programmed accordingly. Quantum processor 811 then processes the input signal. This processing may involve at least one quantum computation including at least one iteration of adiabatic quantum computation and/or quantum annealing. The result of this process is then transmitted through signal output system 812 to feedback system 813. Feedback system 813 may evaluate the output of quantum processor 811 against some predetermined solution criteria. If the predetermined solution criteria are met, feedback system 813 may return the output of quantum processor 811 as the final solution to the problem at output 802. If the predetermined solution criteria are not met, then feedback system 813 may use the output of quantum processor 811 to adjust the programmed input signal in signal input system 810. At this stage, the output of a first iteration of a quantum computation in quantum processor 811 may be re-cast through signal input system 810 as the initial solution used to program the programmable elements of quantum processor 811 in advance of a subsequent iteration of a quantum computation.

In different embodiments of the present systems, methods, and apparatus a signal input system, such as signal input system 810, may comprise different components depending on the nature of the input signals required. For instance, signal input system 810 may comprise a plurality of individual signal lines that communicate with programmable elements, such as qubits and coupling devices, within quantum processor 811. In some embodiments, signal input system 810 may comprise at least one memory register and a memory administration system such as that described in U.S. patent application Ser. No. 11/950,276. In some embodiments, at least some components of signal input system 810 may be superconducting.

Similarly, in different embodiments of the present systems, methods, and apparatus a signal output system, such as signal output system 812, may comprise different components depending on the nature of the output signals being produced. For instance, signal output system 812 may comprise a plurality of individual signal lines that communicate with programmable elements, such as qubits, within quantum processor 811. In some embodiments, signal output system 812 may comprise readout devices that measure the states of the qubits in quantum processor 811. In some embodiments, at least some of the components of signal output system 812 may be superconducting. For instance, at least some readout devices may be superconducting quantum interference devices (SQUIDs). In some embodiments, at least some readout devices may include latching qubits as described in U.S. Provisional Patent Application Ser. No. 60/974,743, filed Sep. 24, 2007 and entitled "Systems, Methods and Apparatus for Qubit State Readout."

Figure 9:
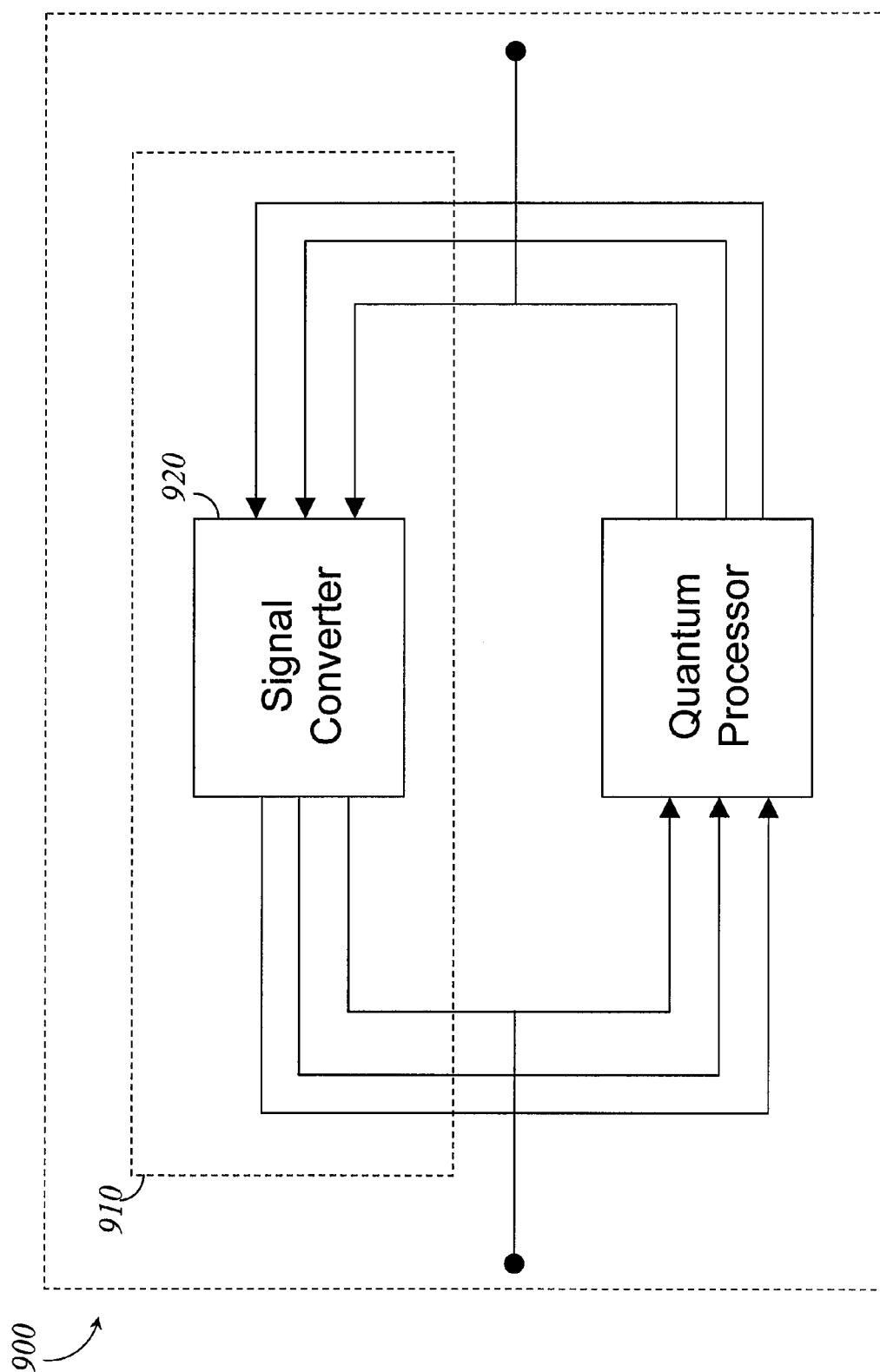
FIG. 9 is a functional diagram that illustrates an embodiment of a quantum computing system with a feedback system that includes a signal converter.

Lastly, in different embodiments of the present systems, methods and apparatus a feedback system, such as feedback system 813, may comprise different components depending on the nature of the feedback required. For instance, methods 500, 600, and 700 may each be implemented using a quantum computing system that incorporates a feedback system and the system requirements for each may differ. For example, in some quantum computing systems the format of a signal that is output by the quantum processor may not be immediately compatible as an input for the same quantum processor. In some embodiments, feedback system 813 may include a signal converter that converts a signal that is output by the quantum processor into a form that may be read by an input of the quantum processor. FIG. 9 is a functional diagram that illustrates an embodiment of a quantum computing system 900 with a feedback system 910 in which the feedback system 910 includes a signal converter 920. In the embodiment illustrated in FIG. 9, a signal that is output from the quantum processor is directly converted into a signal that is input into the quantum processor. However, in other embodiments it may be advantageous to process the signal that is output by the quantum processor to a greater extent before returning the signal as an input to the quantum processor. For instance, in some embodiments feedback system 813 from FIG. 8 may include a processing component that processes a signal that is output by the quantum processor. The nature of the "processing" action depends on the specific implementation of the recursive quantum computing algorithm. Processing of a signal that is output by the quantum processor may include, but is not limited to, interpreting the signal as a solution to the initial problem being solved, evaluating the solution against some predetermined solution criteria, operating on the solution, and computing with the solution with the intention of improving the solution before re-casting it as an input to the quantum processor.

Figure 10:
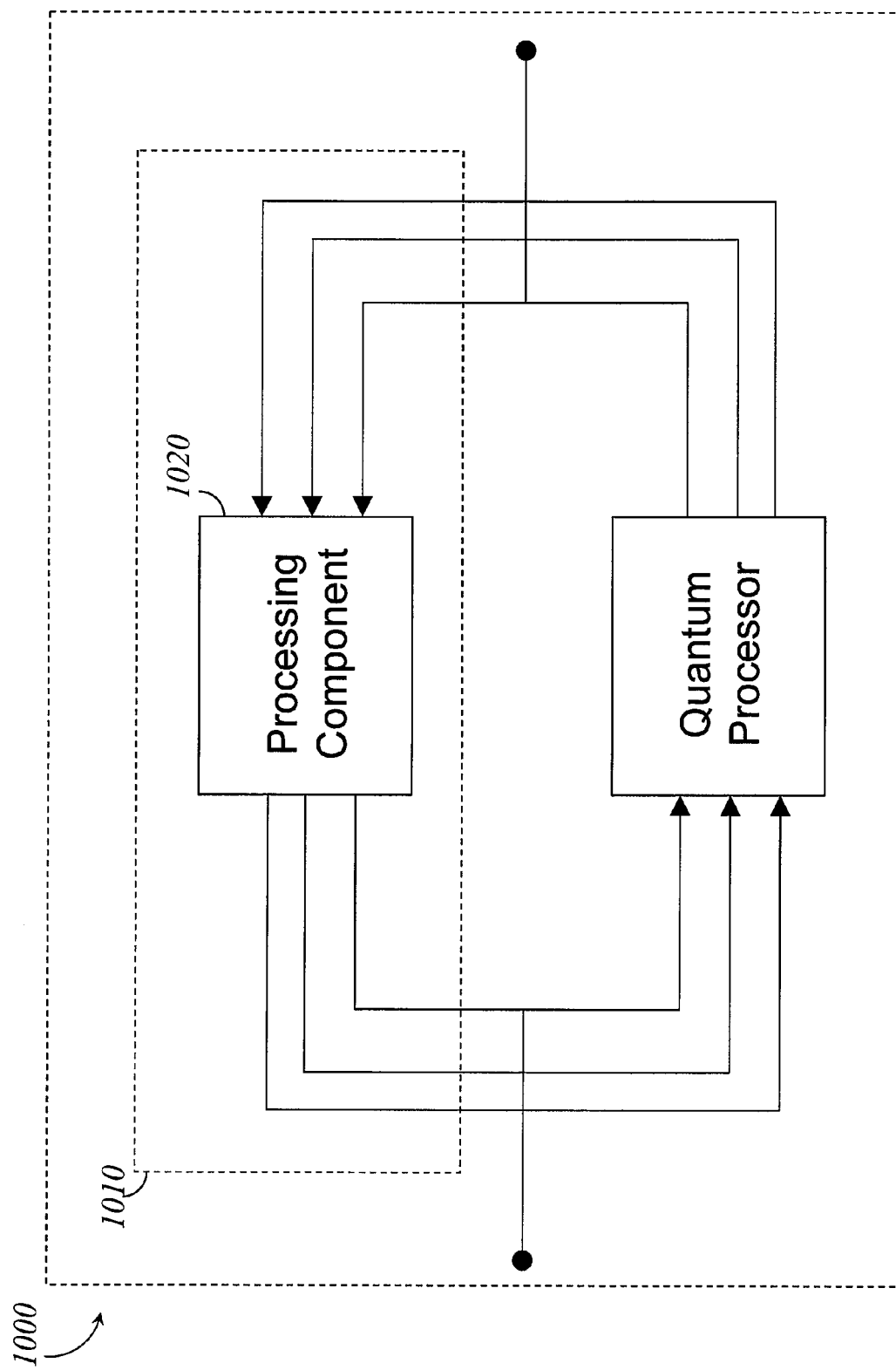
FIG. 10 is a functional diagram of an embodiment of a quantum computing system with a feedback system in which the feedback system includes at least one processing component.

FIG. 10 is a functional diagram of an embodiment of a quantum computing system 1000 with a feedback system 1010 in which the feedback system 1010 includes at least one processing component 1020. In the embodiment shown in FIG. 10, the processing component results in a signal that has been converted into a form that may be read by an input of the quantum processor. However, in other embodiments it may be advantageous to include a signal converter in conjunction with a processing component within the feedback system. In still other embodiments, it may be advantageous to include a user interface in the feedback system through which a user may perform a variety of tasks, including but not limited to: monitoring the progress of the recursive quantum computing algorithm, operating on a result from the quantum processor, defining the solution criteria, and evaluating a result from the quantum processor.

Figure 11:
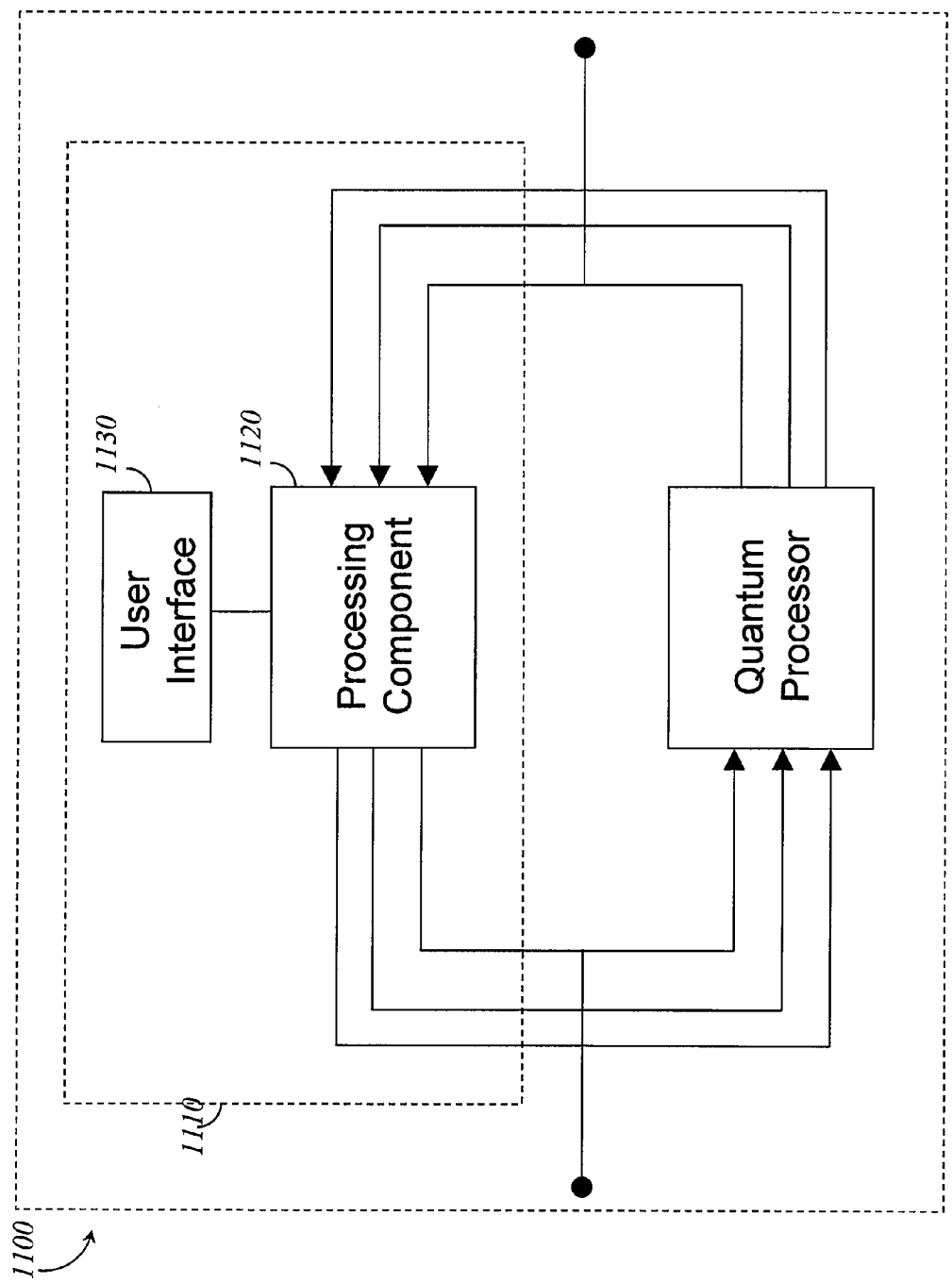
FIG. 11 is a functional diagram of an embodiment of a quantum computing system with a feedback system in which the feedback system includes a processing component and a user interface.

FIG. 11 is a functional diagram of an embodiment of a quantum computing system 1100 with a feedback system 1110 in which the feedback system 1110 includes a processing component 1120 and a user interface 1130. In some embodiments, user interface 1130 may be a classical computer or a measuring device such as an oscilloscope, a voltmeter, or a network analyzer. Those of skill in the art will appreciate that the exact natures of processing component 1120 and user interface 1130 may vary depending on the requirements of the problem being solved.

As previously described, an implementation of adiabatic quantum computing or quantum annealing typically involves evolving past a plurality of anti-crossings. It is typically desirable to evolve past such anti-crossings without transitioning into a higher energy state. This can be more difficult for some anti-crossings than for others. For example, evolving past a particularly small anti-crossing without transitioning into the higher energy state can necessitate an unfeasibly slow evolution in the vicinity of the anti-crossing. However, the concepts of recursive quantum computation described in the present systems, methods and apparatus help, at least to some extent, to overcome this challenge. For example, the concepts of recursive quantum computation taught herein may effectively realize an evolution scheme where it is not essential to provide a single evolution path in which all anti-crossings are passed without transitioning in one single iteration. In the recursive techniques taught herein, a single anti-crossing may be effectively "passed without an undesirable transition" in a first iteration and the benefits of this achievement may be propagated through to all subsequent iterations. In some embodiments, the challenge of passing all anti-crossings without an undesirable transition in a single evolution may be broken down into a more manageable challenge of passing a distinct set of anti-crossings without an undesirable transition in each of a plurality of sequential evolutions. For example, a given energy spectrum may have three anti-crossings, where typical techniques of adiabatic quantum computation would require a single evolution during which all three anti-crossings are passed without an undesirable transition. In some embodiments of recursive quantum computation as taught herein, the same result may be achieved by running three iterations where each iterations is only required to pass a unique one of the three anti-crossings without an undesirable transition.

Furthermore, the concepts of recursive quantum computation taught herein provide a series of multiple evolution paths towards the same final Hamiltonian. In some embodiments, this may have the effect of changing the size and nature of the anti-crossings from one iteration to the next, thereby increasing the likelihood of evolving passed at least some anti-crossings without an undesirable transition in any given iteration. For example, in some embodiments the reconfiguration of the initial Hamiltonian in a later iteration may result in an evolution path that has at least one larger anti-crossing than was present in an earlier iteration, thereby increasing the likelihood of passing that anti-crossing without an undesirable transition.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, methods and apparatus of quantum computation, not necessarily the exemplary systems, methods and apparatus for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to: U.S. Provisional Patent Application Ser. No. 60/943,519, filed Jun. 12, 2007 and entitled "Systems, Methods, And Apparatus For Recursive Quantum Computing Algorithms", U.S. Pat. No. 6,838,694, U.S. Pat. No. 7,335,909, US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing", U.S. Provisional Patent Application Ser. No. 61/039,710, filed Mar. 26, 2008 and entitled "Systems, Devices, And Methods For Analog Processing", US Patent Publication No. 2006-0147154, U.S. patent application Ser. No. 12/017,995, U.S. Pat. No. 7,135,701, U.S. patent application Ser. No. 11/950,276, and U.S. Provisional Patent Application Ser. No. 60/974,743, filed Sep. 24, 2007 and entitled "Systems, Methods and Apparatus for Qubit State Readout" are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of solving a problem, the method comprising:
   establishing an initial solution to the problem;
   encoding the initial solution in an initial state of at least a portion of a quantum computing system;
   performing a quantum computation with the quantum computing system that results in a final state of the at least a portion of the quantum computing system, wherein the final state represents an intermediate solution to the problem and wherein performing a quantum computation with the quantum computing system includes performing at least one of adiabatic quantum computation or quantum annealing;

evaluating the intermediate solution to the problem against a set of at least one solution criterion; and in response to the intermediate solution not satisfying the set of at least one solution criterion, repeating the encoding, performing quantum computation and evaluating with the intermediate solution encoded as the initial state of the at least a portion of the quantum computing system until the set of at least one solution criterion is satisfied.

2. The method of claim 1 wherein encoding the initial solution in an initial state of at least a portion of a quantum computing system includes encoding the initial solution in the initial state of at least a portion of at least one superconducting quantum processor that includes at least two superconducting devices.

3. The method of claim 2 wherein encoding the initial solution in the initial state of at least a portion of at least one superconducting quantum processor includes encoding the initial solution in the initial state of at least one superconducting quantum processor that includes at least one of: a superconducting flux qubit, a superconducting phase qubit, a superconducting charge qubit, a superconducting hybrid qubit, or a superconducting coupling device.

4. The method of claim 1 wherein establishing the initial solution to the problem includes determining at least one of: a random initial solution, an educated estimate, a known approximation, the result of a classical heuristic, the result of a classical computation, or the result of a quantum computation.

5. The method of claim 1 wherein evaluating the intermediate solution to the problem against a set of at least one solution criterion includes evaluating the intermediate solution against at least one of: a minimum degree of solution accuracy, a maximum allowed computation time, or a maximum allowed number of iterations.

6. A method of solving a problem, the method comprising:
    establishing an initial solution to the problem;
    encoding the initial solution in an initial state of at least a portion of a quantum computing system;
    repeating n quantum computations with the quantum computing system to establish a set of n final states of the at least a portion of the quantum computing system wherein each final state in the set of n final states represents a respective intermediate solution to the problem;
    evaluating each intermediate solution to determine a best intermediate solution;
    evaluating the best intermediate solution against a set of at least one solution criterion, wherein the set of at least one solution criterion includes at least one of: a minimum degree of solution accuracy, a maximum allowed computation time, or a maximum allowed number of iterations; and
    in response to the best intermediate solution not satisfying the set of at least one solution criterion, repeating the encoding, performing quantum computation and evaluating with the best intermediate solution encoded as the initial state of the at least a portion of the quantum computing system until the set of at least one solution criterion is satisfied.

7. The method of claim 6 wherein the number of final states n in the $i^{th}$ set of n final states is the same as the number of final states n in the $(i-1)^{th}$ set of n final states.

8. The method of claim 6 wherein the number of final states n in the $i^{th}$ set of n final states is not the same as the number of final states n in the $(i-1)^{th}$ set of n final states, and wherein the number of final states n in the $i^{th}$ set of n final states depends on at least one characteristic of the problem.

9. A quantum computing system comprising:
    a quantum processor including a set of qubits, wherein the set of qubits includes at least two qubits and wherein at least two of the qubits in the set of qubits are configured to couple information between one another;
    a signal input system that communicates with at least one of the qubits;
    a signal output system that communicates with at least one of the qubits, wherein the signal output system includes at least one readout device for reading out a state of at least one qubit in the quantum processor; and
    a feedback system that communicates between the signal input system and the signal output system of the quantum computing system.

10. The quantum computing system of claim 9 wherein the quantum processor is a superconducting quantum processor that includes superconducting devices and wherein at least one of the signal input system, the signal output system, or the feedback system includes at least one superconducting component.

11. The quantum computing system of claim 10 wherein at least one superconducting device in the quantum processor is selected from the group consisting of: a superconducting flux qubit, a superconducting phase qubit, a superconducting charge qubit, a superconducting hybrid qubit, and a superconducting coupling device.

12. The quantum computing system of claim 9 wherein the signal input system includes a plurality of individual signal lines that communicate with the qubits of the quantum processor.

13. The quantum computing system of claim 9 wherein the signal input system includes a memory administration system and wherein the memory administration system includes at least one memory register.

14. The quantum computing system of claim 9 wherein at least one readout device includes a superconducting quantum interference device (SQUID).

15. The quantum computing system of claim 9 wherein the feedback system includes a signal converter that converts a signal that is output by the quantum processor into a form that may be read by an input of the quantum processor.

16. The quantum computing system of claim 15 wherein the signal converter is connected to both the signal output system and the signal input system, such that at least a portion of direct communication between the signal output system and the signal input system passes through the signal converter.

17. The quantum computing system of claim 9 wherein the feedback system includes at least one processing component that processes at least one signal that is output by the quantum processor.

18. The quantum computing system of claim 17 wherein the feedback system includes at least one user interface.

19. A recursive method of quantum computing, the method comprising:
    performing a first iteration wherein a quantum processor is used to perform a quantum computation including at least one of adiabatic quantum computation or quantum annealing, whereby a first solution to a problem is determined; and
    performing a second iteration wherein the quantum processor is used to perform a quantum computation including at least one of adiabatic quantum computation or quantum annealing, whereby a second solution to the problem is determined, and wherein the first solution to the problem is used to influence the quantum computation in the second iteration.

20. The method of claim 19, further comprising:
performing a number N of additional iterations, wherein each of the N additional iterations involves using the quantum processor to perform a quantum computation including at least one of adiabatic quantum computation or quantum annealing such that each of the N additional iterations produces a respective solution to the problem, wherein the quantum computation in each subsequent one of the N additional iterations is influenced by the solution from at least one previous iteration, and wherein N is a positive integer.

21. A method of solving a problem, the method comprising:
establishing an initial solution to the problem;
encoding the initial solution in an initial state of at least a portion of a quantum computing system;
performing a quantum computation with the quantum computing system that results in a final state of the at least a portion of the quantum computing system, wherein the final state represents an intermediate solution to the problem;
evaluating the intermediate solution to the problem against a set of at least one solution criterion, wherein the set of at least one solution criterion includes at least one of: a minimum degree of solution accuracy, a maximum allowed computation time, or a maximum allowed number of iterations; and
in response to the intermediate solution not satisfying the set of at least one solution criterion, repeating the encoding, performing quantum computation and evaluating with the intermediate solution encoded as the initial state of the at least a portion of the quantum computing system until the set of at least one solution criterion is satisfied.

22. The method of claim 21 wherein encoding the initial solution in an initial state of at least a portion of a quantum computing system includes encoding the initial solution in the initial state in at least a portion of an adiabatic quantum computing system and performing the quantum computation includes performing at least one adiabatic quantum computation.

23. The method of claim 21 wherein performing the quantum computation includes quantum annealing.

24. The method of claim 21 wherein encoding the initial solution in an initial state of at least a portion of a quantum computing system includes encoding the initial solution in the initial state of at least a portion of at least one superconducting quantum processor that includes at least two superconducting devices.

25. The method of claim 24 wherein encoding the initial solution in the initial state of at least a portion of at least one superconducting quantum processor includes encoding the initial state in at least one superconducting quantum processor that includes at least one of: a superconducting flux qubit, a superconducting phase qubit, a superconducting charge qubit, a superconducting hybrid qubit, or a superconducting coupling device.

26. The method of claim 21 wherein establishing the initial solution to the problem includes determining at least one of: a random initial solution, an educated estimate, a known approximation, the result of a classical heuristic, the result of a classical computation, or the result of a quantum computation.

27. A method of solving a problem, the method comprising:
establishing an initial solution to the problem;
encoding the initial solution in an initial state of at least a portion of a quantum computing system;
repeating n quantum computations with the quantum computing system to establish a set of n final states of the at least a portion of the quantum computing system wherein each final state in the set of n final states represents a respective intermediate solution to the problem and wherein each quantum computation includes at least one of adiabatic quantum computation or quantum annealing;
evaluating each intermediate solution to determine a best intermediate solution;
evaluating the best intermediate solution against a set of at least one solution criterion; and
in response to the best intermediate solution not satisfying the set of at least one solution criterion, repeating the encoding, performing quantum computation and evaluating with the intermediate solution encoded as the initial state of the at least a portion of the quantum computing system until the set of at least one solution criterion is satisfied.

28. A recursive method of quantum computing, the method comprising:
performing a first iteration wherein a quantum processor is used to perform a quantum computation, whereby a first solution to a problem is determined;
evaluating the first solution to the problem against a set of at least one solution criterion, wherein the set of at least one solution criterion includes at least one of: a minimum degree of solution accuracy, a maximum allowed computation time, or a maximum allowed number of iterations; and
in response to the first solution to the problem not satisfying the set of at least one solution criterion:
performing a second iteration wherein the quantum processor is used to perform a quantum computation, whereby a second solution to the problem is determined, and wherein the first solution to the problem is used to influence the quantum computation in the second iteration.

29. The method of claim 28, further comprising:
evaluating the second solution to the problem against the set of at least one solution criterion;
in response to the second solution to the problem not satisfying the set of at least one solution criterion:
performing a number N of additional iterations, wherein each of the N additional iterations involves using the quantum processor to perform a quantum computation such that each of the N additional iterations produces a respective solution to the problem, wherein the quantum computation in each subsequent one of the N additional iterations is influenced by the solution from at least one previous iteration, and wherein N is a positive integer;
performing N additional evaluations, wherein each of the N additional evaluations involves evaluating the solution to the problem against the set of at least one solution criterion until a solution to the problem that satisfies the set of at least one solution criterion is found; and
returning the solution to the problem that satisfies the set of at least one solution criterion as the final solution to the problem.

* * * * *